United States Patent [19]

McCollum et al.

[11] 3,941,327
[45] Mar. 2, 1976

[54] TAPE REEL POSITIONING AND LATCHING MEANS

[75] Inventors: Robert F. McCollum, Tulsa; Robert J. Jones, Bixby; Philip E. Deck, Tulsa, all of Okla.

[73] Assignee: Telex/Computer Products, Inc., Tulsa, Okla.

[22] Filed: Mar. 10, 1971

[21] Appl. No.: 122,740

[52] U.S. Cl. .............................................. 242/68.3
[51] Int. Cl. ............................................ B65h 17/02
[58] Field of Search ........ 242/68.3, 72.1; 287/52.07

[56] References Cited
UNITED STATES PATENTS

| | | | |
|---|---|---|---|
| 2,928,620 | 3/1960 | Stavrakis | 242/68.3 |
| 3,307,797 | 3/1967 | McFeaters | 242/68.3 |
| 3,310,253 | 3/1967 | Rayfield | 242/68.3 |
| 3,366,343 | 1/1968 | Messamer | 242/68.3 |
| 3,379,388 | 4/1968 | Gryczelak | 242/68.3 |

*Primary Examiner*—Edward J. McCarthy
*Attorney, Agent, or Firm*—Head & Johnson

[57] ABSTRACT

This invention covers means in connection with magnetic recording devices, to position, latch and remove reels from a driving hub, and actuation means therefor. The hub onto which the tape reel is placed carries an elastic sleeve about which the reel is placed. An actuation rod which passes through the hollow shaft of the drive motor carries a spool, to which three link bars are hinged. These are in radial planes spaced at 120° to each other. The link bars are attached respectively to three shoes which are adapted to press outward against the inside wall of the elastic sleeve, which expanded outward against, and securely grips the reel hub. Also involved in the linkages between the link bars and the shoes are three dogs, which are adapted to press the reel hub against the drive hub and/or to lift the reel hub, depending on the position of the actuator rod. The actuator rod is adapted to be operated in push-pull fashion by a handle on the front face of the mechanism, or by means of a vacuum actuator mounted behind the reel drive motor.

8 Claims, 9 Drawing Figures

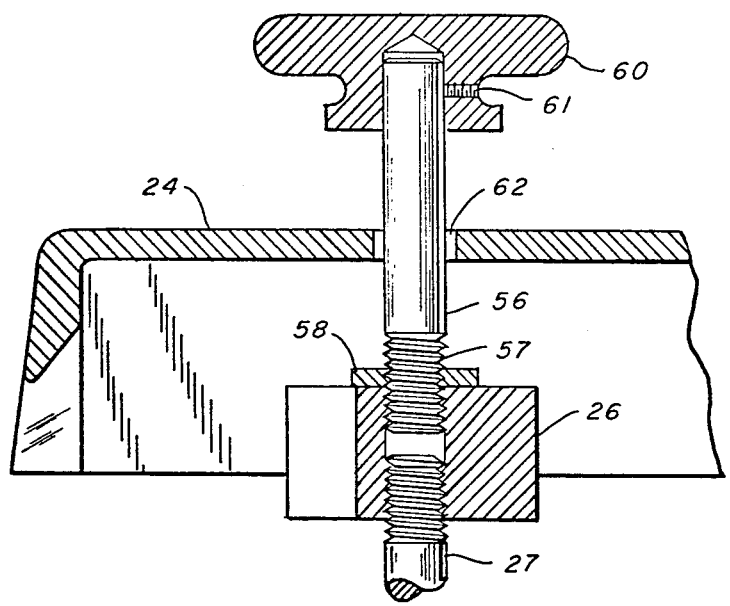
FIG. 6
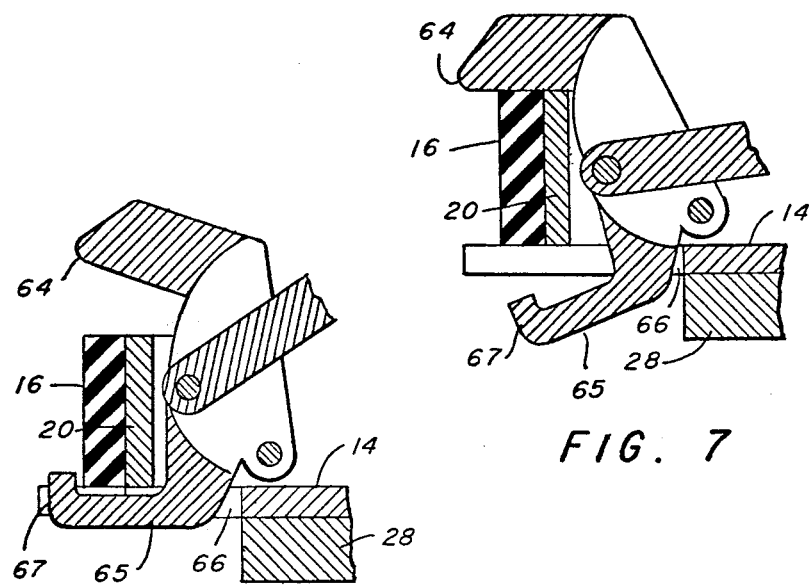
FIG. 7A
FIG. 7

TAPE REEL POSITIONING AND LATCHING MEANS

BACKGROUND OF THE INVENTION

1. Field of the Invention

This invention is in the field of magnetic tape recording devices. More particularly it relates to devices for holding and driving tape reels and the like. More particularly it concerns devices that provide a high driving torque to the reel while providing ease of placement and rapid locking and removal of the reel. 2. Description of the Prior Art Magnetic tape reel drive mechanisms have been in use for many years. However, the prior art devices generally lack the desirable combination of high driving torque without slippage of the reel on the hub, and rapid mounting and dismounting of reels. This is a particular problem in digital tape transports, where, in normal practice, reels are changed frequently and, in operation, are rotationally accelerated and decelerated rapidly and often, all of which tends to cause slippage of the reel on the hub.

SUMMARY OF THE INVENTION

Accordingly, it is an object of this invention to provide a tape reel holding, locking and driving device, which is capable of both imparting a large driving torque to the reel and provides for fast engagement and disengagement of the reel from the device.

Another object is to provide a reel support and driving device that in placement of the reel on the driving hub first presses the reel onto a seat on the driving hub before it engages the reel in high-torque driving contact, and conversely, on removal of the reel it provides for lifting the reel out of its seat after the driving contact is broken.

These objects are effected by this invention in the following way: A central operating rod which can be operated by hand from the front, or by a vacuum actuator from the rear, is pushed-in, toward the reel to clamp, and pulled out to release, the reel. Three radial links from the rod operate three shoes, which are adapted to push out radially against an elastic sleeve or ring, about which the reel is placed. Also involved in the linkages are three dogs which in the "pushed-in," or "clamped," position press the reel onto the hub, and in the "pulled-out" position lift the reel off the hub.

These and other objects, and a better understanding of the invention will become apparent from reference to the following description taken in conjunction with the attached drawings in which:

BRIEF DESCRIPTION OF THE DRAWINGS

FIG. 6 illustrates a hand operated embodiment.

FIGS. 7A and 7B show a second embodiment of the clamping dogs in unclamped and clamped condition, respectively.

DESCRIPTION OF THE PREFERRED EMBODIMENTS

Figure 1:
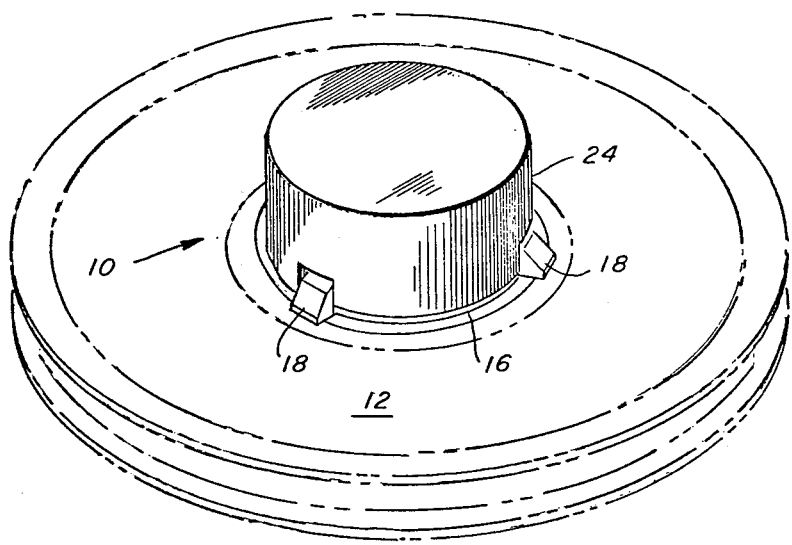
FIG. 1 shows an overall view of the device with a reel mounted thereon.

Referring now to the drawings and in particular to FIG. 1, we show an overall view of the clamping device 10 of this invention with a reel 12 mounted on the hub. Shown are the clamping dogs 18 which press the reel to the driving hub, and the elastic sleeve 16 which radially clamps the reel to the driving hub.

Figure 2:
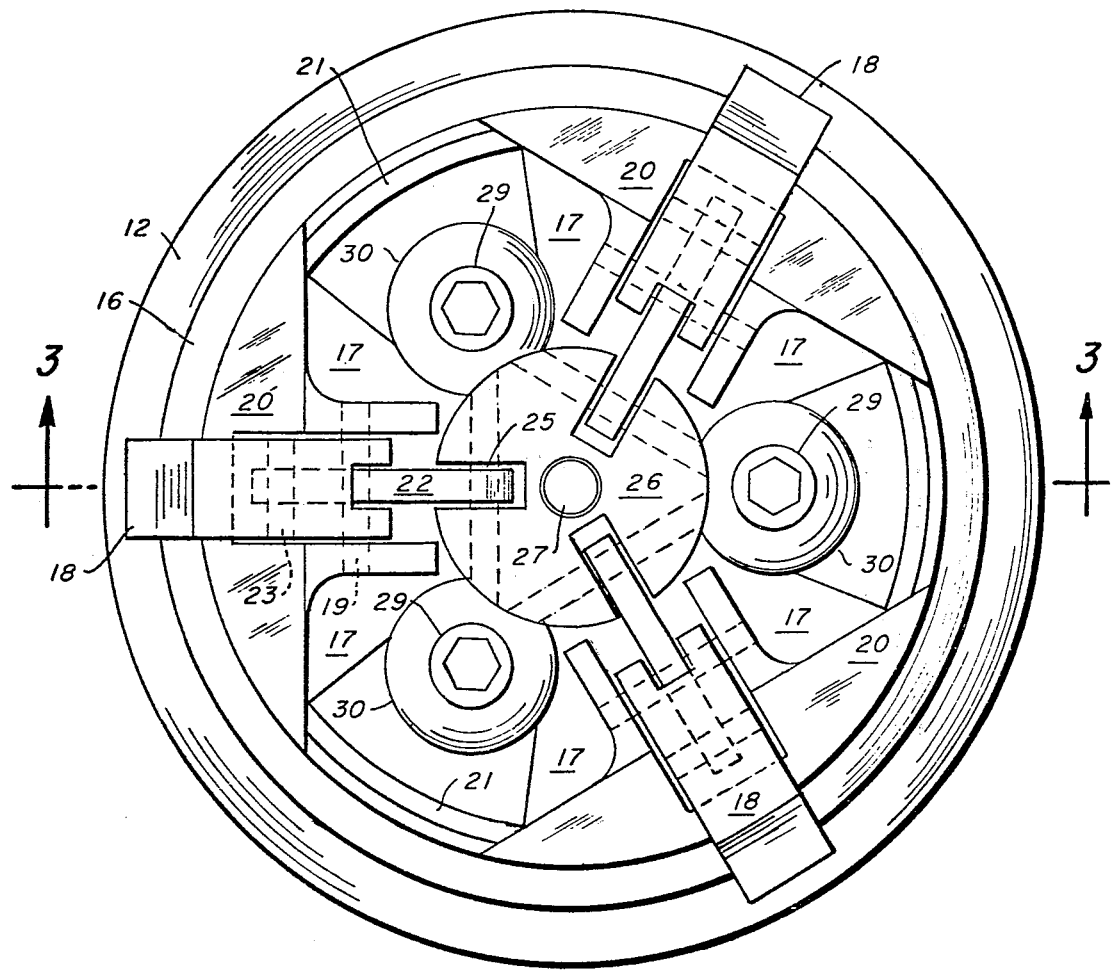
FIG. 2 shows a plan view of the device with cover removed.
Figure 3A:
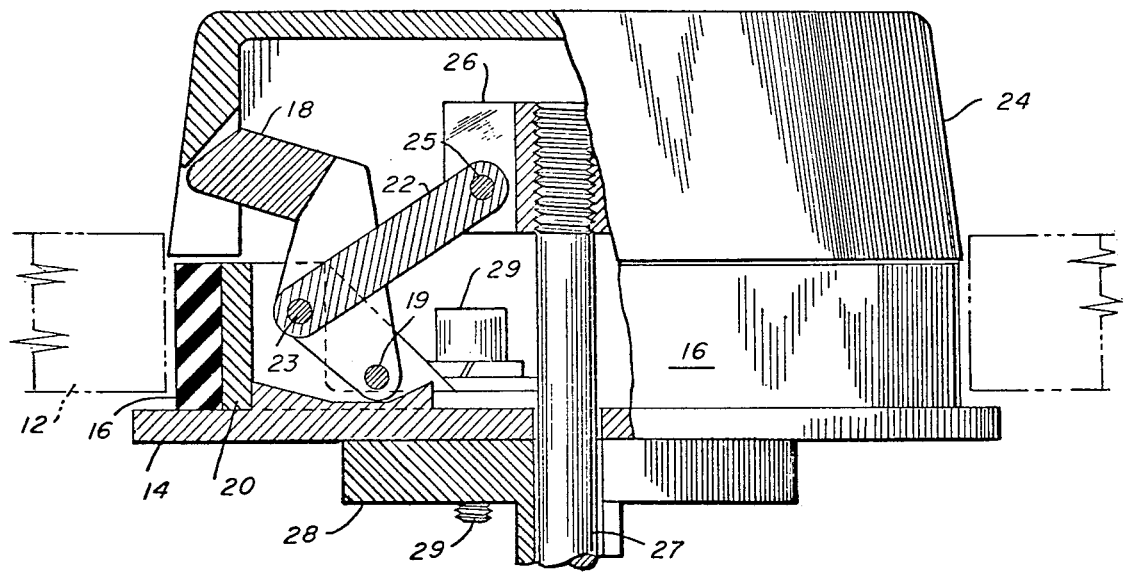
FIGS. 3A and 3B show the two elevation views, in section, in the unclamped and clamped condition respectively.
Figure 3B:
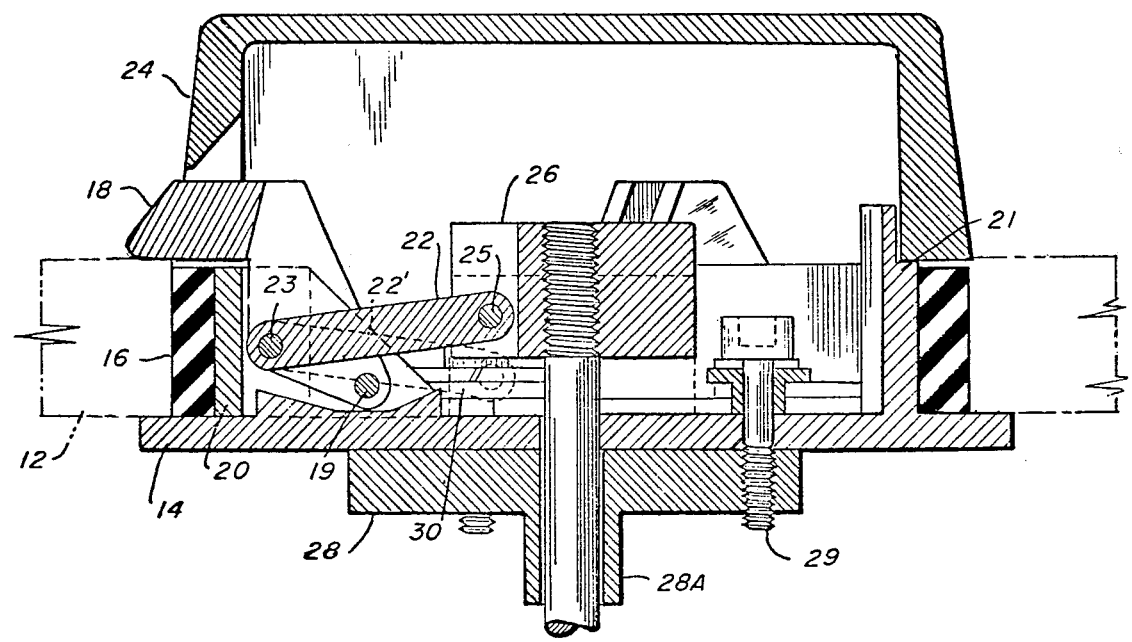

FIGS. 2, 3A and 3B show the details of the invention, FIG. 2 in plan view, and FIGS. 3A and 3B in elevation section. The driving hub 14 has a cylindrical wall 21 which forms a support for the elastic sleeve 16. This wall 21 is cut away in three large windows to permit placement of the shoes 20, which continue the circular arc of the remnants of the wall 21. The plastic sleeve 16 also surrounds the three shoes 20 which are locked in between the sleeve and (at their tips) by the wall remnants 21. The shoes seat on the hub plate 14 and are adapted to slide radially outward as will be explained below. The shoes are further held to the hub plate by stepped washers 30 that have a flange which overhangs the base 17 of the shoe. These stepped washers are held by three screws 29 which as shown in FIG. 3B also clamp the hub plate 14 to the flange 28 of the motor shaft 28A.

The motor shaft 28A is hollow and an actuating, or operating, rod passes through the internal passage. One end of the rod is threaded into a central spool 26 that has three radial slots into which link bars 22 are hinged on pins 25. The other ends of the link bars 22 are hinged by pins 23 to operating dogs 18. As shown in FIG. 2, these have milled slots into which the link bars pass. The operating dogs 18 are also hinged, by pins 19 to the shoes 20.

The geometry of the linkages are such that when the operating rod is in the "out" or "forward" position the reel is unclamped and ready to be removed. This is shown in FIG. 3A where the lips on the operating dogs are withdrawn into slots in the cover 24 and there is adequate clearance for a reel hub to be passed over the device to be positioned on, or removed from, the hub.

Now, as the operating rod is moved inward, the apparatus takes the form shown in FIG. 3B. As the spool 26 moves in toward the hub plate, the link 22 pushes on pin 23 and dog 18, rotating it about pin 19, into a position where the lip is pressed on the reel 12 (shown dashed).

As the spool is depressed further pressure outward on pin 19 causes the shoe to move outward, compressing the elastic sleeve 16 against the inside of the reel hub 12 and gripping it in torque transmitting action. Because of the angle of the links 22, there is a magnification of radial force outward of 5 to 1 or greater, over the tensile force in the rod 27. Thus a relatively weak force will provide secure gripping of the reel hub to the elastic sleeve.

Thus, we see that as the operating rod is moved, the tips of the dog first accurately position the reel hub against plate 14, and then clamps it radially. In the reverse operation the radial clamping is removed, then the dog lips are retracted and the reel can be removed.

Figure 4:
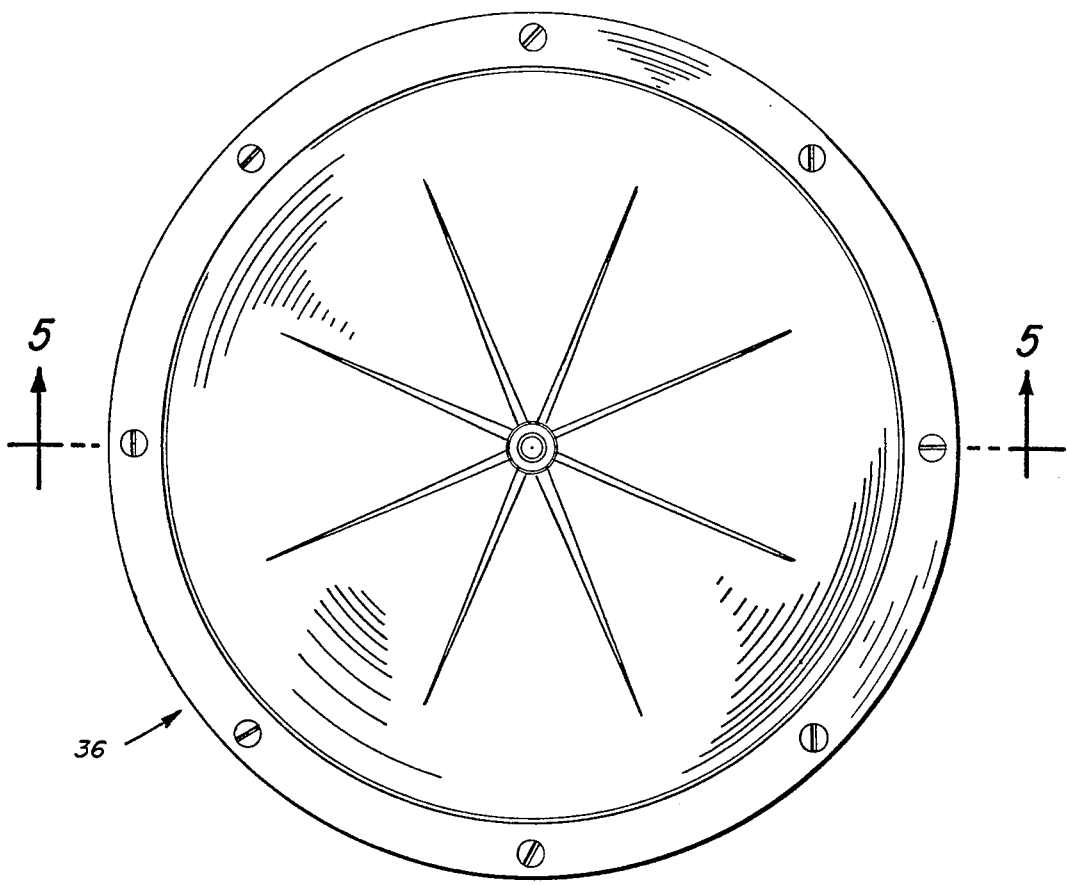
FIGS. 4 and 5 show, respectively, a plan outer view of the vacuum actuator and a sectional view in elevation.
Figure 5:
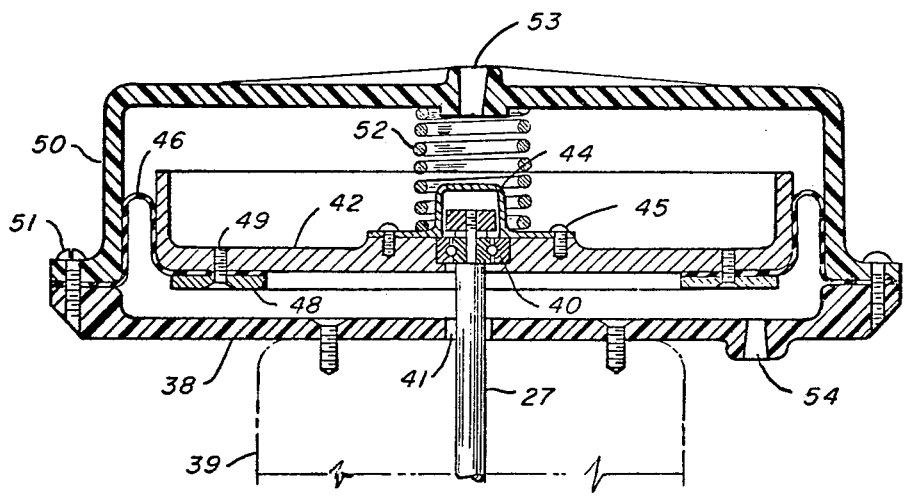

In FIGS. 4 and 5 we show a type of vacuum or pneumatic operating actuator for use with this invention. It comprises an adapter plate that is mounted behind the operating deck of the magnetic recorder. It is shown as being mounted to the back end of the motor 39 that drives the reel. It has a central opening 41 through which the actuator rod 27 passes through, from the spool on the front end. The back end of the rod 27 is clamped to the inner race of the bearing 40, the outer race of which is clamped in a piston 42 by means of retainer 44, which also provides an airtight seal around the bearing 40. A rolling disphragm 46 is clamped at its inner periphery to the piston 42 by clamp ring 48. At its outer periphery it is clamped to the adapter plate 38 by the flange of the cylinder housing 50, by means of screws 51. A vacuum connection at 53 permits operation by a vacuum source. A pressure connection at 54 permits operation by air pressure. A compression spring 52 acts to move the piston toward the adapter plate on the release of vacuum or pressure.

Returning to FIG. 3B, the end position of the link bar 22 is shown in the clamp condition. This is the case for a vacuum operation, where a continuing force on the actuation rod is available. On the other hand, it is possible, in the absence of the vacuum actuator, to operate the rod 27 by hand, as will be shown in connection with FIG. 6. In the case of hand operation a continuing force is not available. In that case the spool 26 and rod 27 are pushed farther until the link has reached the dash position 22', which is beyond center, thus locking the link in position 22', where it remains, and where the shoe 20 remains in its outermost position clamping the reel tightly to the elastic sleeve 16.

In FIG. 6, I show how a short threaded rod 56 can be screwed at end 57 into the top of the spool 26 and locked with nut 58. This shaft can pass through opening 62 in the cover 24, and can carry a knob 60, attached by screws 61. Operation of the rod, and the clamping mechanism can be effected by pushing or pulling on the knob 60.

In FIGS. 7A and 7B we show a variation in the construction of the clamping dogs 18 into a new shape 64. These dogs now have the same clamp tip as the dogs 18. Also, they have lower extensions 65, of the shape shown, which operate in slots 66 in the hub plate 14. When the operating rod 27 is out, which retracts the shoes 20 and elastic sleeve 16, and the dog 18 is retracted inside the cover 24, then the lower tip 67 of the arm 65 of the dog 64 projects up above the plate 14, lifting the reel off its seat on the plate 14. On the other hand, when the reel is clamped, as in FIG. 7B, the lower tip 67 is retracted below the level of plate 14, permitting the reel hub to seat thereon.

While the invention has been described with a certain degree of particularity, it is manifest that many changes may be made in the details of construction and the arrangement of components. It is understood that the invention is not to be limited to the specific embodiment set forth herein by way of exemplifying the invention, but the invention is to be limited only by the scope of the attached claim or claims, including the full range of equivalency to which each element or step thereof is entitled.

What is claimed is:

1. In a tape reel positioning and latching means, in which a reel is mounted on a hub plate fastened to the hollow shaft of a driving motor, the improvement comprising:
    a. actuation rod means which passes through the central passage of said motor shaft, from the front of said motor toward the back thereof;
    b. spool means mounted on one end of said rod at the front end of said motor, a plurality of operating links placed in equally spaced radial planes and hinged at their first ends to said spool means;
    c. said plurality of operating links hinged at their second ends to a corresponding plurality of operating dog means;
    d. said plurality of operating dogs hinged to a corresponding plurality of shoe means adapted to slide in a radial direction;
    e. elastic sleeve means surrounding said plurality of shoe means, said sleeve further guided so that its outer surface forms a substantially circular cylindrical wall of slightly less diameter than the diameter of the central opening of the reel hub;
    f. said links, dogs and shoes adapted, in combination, when said spool is pressed in toward said motor,
        1. to rotate said dogs so as to press said reel hub to said hub plate, and
        2. to force said shoes radially outward to compress said sleeve against said reel hub, to hold it in intimate, torque-transmitting contact.

2. The tape reel positioning and latching means as in claim 1, including means to apply a longitudinal force to said rod means.

3. The tape reel positioning and latching means as in claim 2 in which said means to apply a longitudinal force to said rod means comprises vacuum means mounted at the back of said motor.

4. The tape reel positioning and latching means as in claim 3 in which said means to apply a longitudinal force to said rod means comprises pneumatic means mounted at the back of said motor.

5. The tape reel positioning and latching means as in claim 2, including a manual control on said rod, and including means, when said spool is pressed toward said motor, to position said spool so that said links are locked by toggle action, and said sleeve remains in compressed condition until said rod is manually pulled out.

6. The tape reel positioning and latching means as in claim 1 in which said dog means includes locking tips, which, when said spool is moved inward, press said reel hub onto said hub plate and when said spool is moved outward has removal tips that lift said reel hub off said hub plate.

7. The tape reel positioning and latching means as in claim 1 in which said dog means are rotated by said links into clamping position before said shoes are moved to clamping position.

8. The tape reel positioning and latching means as in claim 2 including bearing means between said rod means and said force means, whereby said force means may be held stationary while said rod means rotates with said motor shaft.

* * * * *